(12) United States Patent
Hwang et al.

(10) Patent No.: US 7,796,212 B2
(45) Date of Patent: Sep. 14, 2010

(54) LIQUID CRYSTAL DISPLAY DEVICE HAVING IMPROVED VIEWING ANGLE AND BRIGHTNESS

(75) Inventors: Seong-mo Hwang, Seongnam-si (KR); Moon-gyu Lee, Suwon-si (KR); Jee-hong Min, Seongnam-si (KR); Young-chan Kim, Suwon-si (KR); Kyu-min Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 11/925,176

(22) Filed: Oct. 26, 2007

(65) Prior Publication Data

US 2008/0252816 A1 Oct. 16, 2008

(30) Foreign Application Priority Data

Apr. 12, 2007 (KR) .................. 10-2007-0036174

(51) Int. Cl.
*G02F 1/13357* (2006.01)
(52) U.S. Cl. .................. 349/65; 385/146
(58) Field of Classification Search .............. None
See application file for complete search history.

(56) References Cited

U.S. PATENT DOCUMENTS

| | | | | |
|---|---|---|---|---|
| 5,587,816 | A * | 12/1996 | Gunjima et al. | 349/62 |
| 6,239,851 | B1 * | 5/2001 | Hatazawa et al. | 349/62 |
| 6,644,824 | B2 * | 11/2003 | Baba | 362/609 |
| 2001/0026335 | A1 | 10/2001 | Moon | |
| 2003/0107689 | A1 * | 6/2003 | Park et al. | 349/64 |
| 2003/0137617 | A1 | 7/2003 | Cornelissen et al. | |
| 2004/0207778 | A1 | 10/2004 | Yoon | |
| 2005/0062915 | A1 | 3/2005 | Son et al. | |
| 2006/0279672 | A1 * | 12/2006 | Kim et al. | 349/65 |
| 2007/0047259 | A1 * | 3/2007 | Lee et al. | 362/615 |
| 2007/0132915 | A1 * | 6/2007 | Mi | 349/64 |
| 2007/0247872 | A1 * | 10/2007 | Lee et al. | 362/616 |
| 2007/0252923 | A1 * | 11/2007 | Hwang et al. | 349/65 |
| 2007/0263139 | A1 * | 11/2007 | Hwang et al. | 349/96 |
| 2008/0186738 | A1 * | 8/2008 | Kim et al. | 362/620 |

FOREIGN PATENT DOCUMENTS

| | | |
|---|---|---|
| KR | 1020030065844 A | 8/2003 |
| WO | 9722834 | 6/1997 |
| WO | WO 97/22834 A1 * | 6/1997 |
| WO | 03002908 A1 | 1/2003 |

\* cited by examiner

*Primary Examiner*—Mike Stahl
(74) *Attorney, Agent, or Firm*—Sughrue Mion, PLLC

(57) ABSTRACT

A liquid crystal display with an improved viewing angle and brightness is provided. The liquid crystal display includes a light source unit and a polarized light guide plate having an incident surface onto which unpolarized light from the light source unit is incident. The polarized light guide plate polarizes, collimates, and out-couples the incident light. The liquid crystal display also includes a liquid crystal panel which modulates the light out-coupled and illuminated from the polarized light guide plate to form images, and a diffusion layer which diffuses the light modulated in the liquid crystal panel.

16 Claims, 8 Drawing Sheets

LIQUID CRYSTAL DISPLAY DEVICE HAVING IMPROVED VIEWING ANGLE AND BRIGHTNESS

CROSS-REFERENCE TO RELATED PATENT APPLICATION

This application claims priority from Korean Patent Application No. 10-2007-0036174, filed on Apr. 12, 2007 in the Korean Intellectual Property Office, the disclosure of which is incorporated by reference in its entirety.

BACKGROUND OF THE INVENTION

1. Field of the Invention

Apparatuses consistent with the present invention relate to a liquid crystal display having an improved viewing angle and brightness, and more particularly, to a liquid crystal display with a polarized light guide plate which has improved polarization separating performance and increases the amount of light illuminated along the normal direction to provide a wide viewing angle and a high brightness.

2. Description of the Related Art

A liquid crystal display is a non-emissive flat panel display device which requires an additional light source to form images, such as a backlight unit. Generally, a liquid crystal display has low light efficiency. The liquid crystal display converts or preserves the polarization of linearly polarized light transmitted through liquid crystals, to transmit or block the light based on the arrangement of the liquid crystals. The liquid crystal display uses only light that is linearly polarized in one direction, and thus polarization plates are formed on both sides of the liquid crystal display. These are absorptive polarization plates that transmit light polarized in one direction and absorb light polarized in another direction. Since the absorptive polarization plates absorb about 50% of the incident light, they are the greatest cause of the low light efficiency of the liquid crystal display.

Examples of operation modes for liquid crystals to form images in a liquid crystal display include a twisted nematic (TN) mode, an in-plane switching (IPS) mode, and a vertical alignment (VA) mode. The TN mode is easy and inexpensive to manufacture, and thus is frequently used in mobile phones or laptop computers. However, the TN mode causes the contrast ratio to change and the gray scale to reverse based on the viewing angle. These phenomena are due to the 90° twisted structure of TN cells. In other words, when the light from the illumination system is linearly polarized by the polarization plates and then transmitted through optically anisotropic liquid crystals, the phase of the light varies based on the angle at which the light passes through the liquid crystals. For example, the phase delay degree of the light varies when the light passes through the liquid crystals vertically and when the light passes through the liquid crystals at an angle, thereby generating a phase difference.

FIG. 1 is a schematic view of a related art liquid crystal display 30. Referring to FIG. 1, the liquid crystal display 30 includes a light source 26, a light guide plate 32, an optical path controlling layer 34, a liquid crystal panel 14, and a diffusion plate 16. Light 22 passing the light guide plate 32 at an angle of $\theta_1$ with respect to a vertical line N is collimated in a distribution range of about ±10° with respect to light 23 having an angle of $\theta_2$ with respect to the vertical line N while passing the optical path controlling layer 34, and is then incident on the liquid crystal panel 14. An image formed on the liquid crystal panel 14 passes through the diffusion plate 16 and thus has a wider viewing angle. Although the liquid crystal display has an improved viewing angle, the maximum front brightness is not achieved. Also, because the liquid crystal display has a structure in which unpolarized light is incident on the liquid crystal panel, the light efficiency is low and the front brightness is limited.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a liquid crystal display having a wide viewing angle and a high brightness.

According to an aspect of the present invention, there is provided a liquid crystal display including a light source unit and a polarized light guide plate having an incident surface onto which unpolarized light from the light source unit is incident. The polarized light guide plate polarizes, collimates, and out-couples the incident light. The liquid crystal display also includes a liquid crystal panel which modulates the light out-coupled from the polarized light guide plate to form images; and a diffusion layer which diffuses the light modulated in the liquid crystal panel.

The liquid crystal panel may include a first substrate upon which a first polarization plate is attached; a second substrate upon which a second polarization plate is attached; and a liquid crystal layer encapsulated between the two substrates. A polarization axis of the first polarization plate is perpendicular to a polarization axis of the second polarization plate. The liquid crystals of the liquid crystal layer may be arranged in a twisted nematic (TN) mode or a vertical alignment (VA) mode.

The optical axes of the two polarization plates may be respectively at angles of 0° and 90° to a horizontal direction of the liquid crystal panel.

The polarized light guide plate may include a first layer which guides the incident light; a second layer formed of an optically isotropic material on the first layer, in which out-coupling units having a first convex portion are repeatedly arranged on the second layer; and a third layer formed of an optically anisotropic material on the second layer.

The light source unit may include a point light source; and a light guide bar which guides light from the point light source to the polarized light guide plate.

The out-coupling units may be continuously formed of the first concave portion and the first convex portion, or of the first concave portion, the first convex portion, and the second concave portion, or of the first convex portion and the second convex portion.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
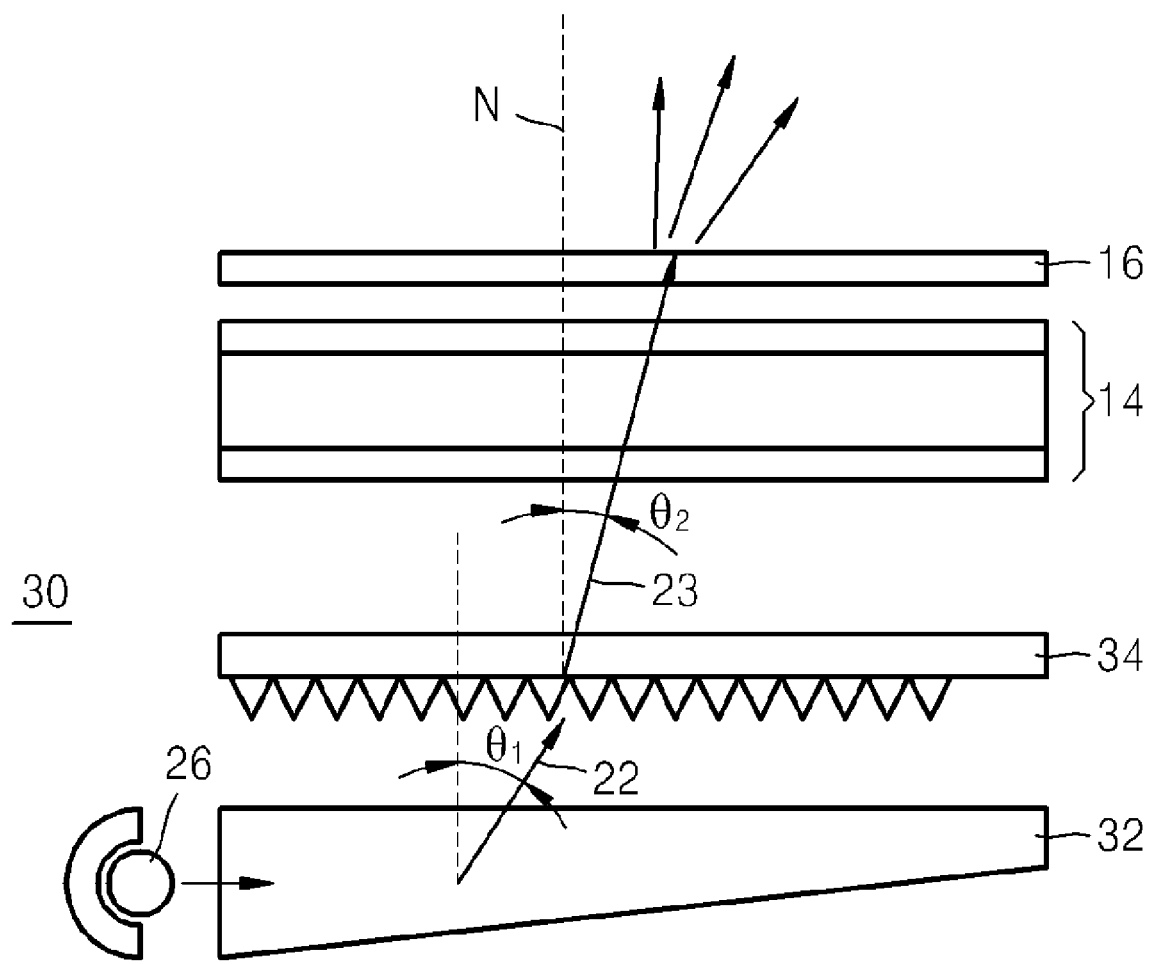
FIG. 1 is a schematic view of a related art liquid crystal display.

The present invention will now be described more fully with reference to the accompanying drawings, in which exemplary embodiments of the invention are shown. These embodiments are provided so that this disclosure will be thorough and complete, and will fully convey the concept of the invention to those skilled in the art. However, the invention may be embodied in many different forms, and should not be construed as being limited to the exemplary embodiments set forth herein. In the drawings, like reference numerals denote like elements, and the thicknesses of layers and regions may be exaggerated for clarity and convenience.

Figure 2:
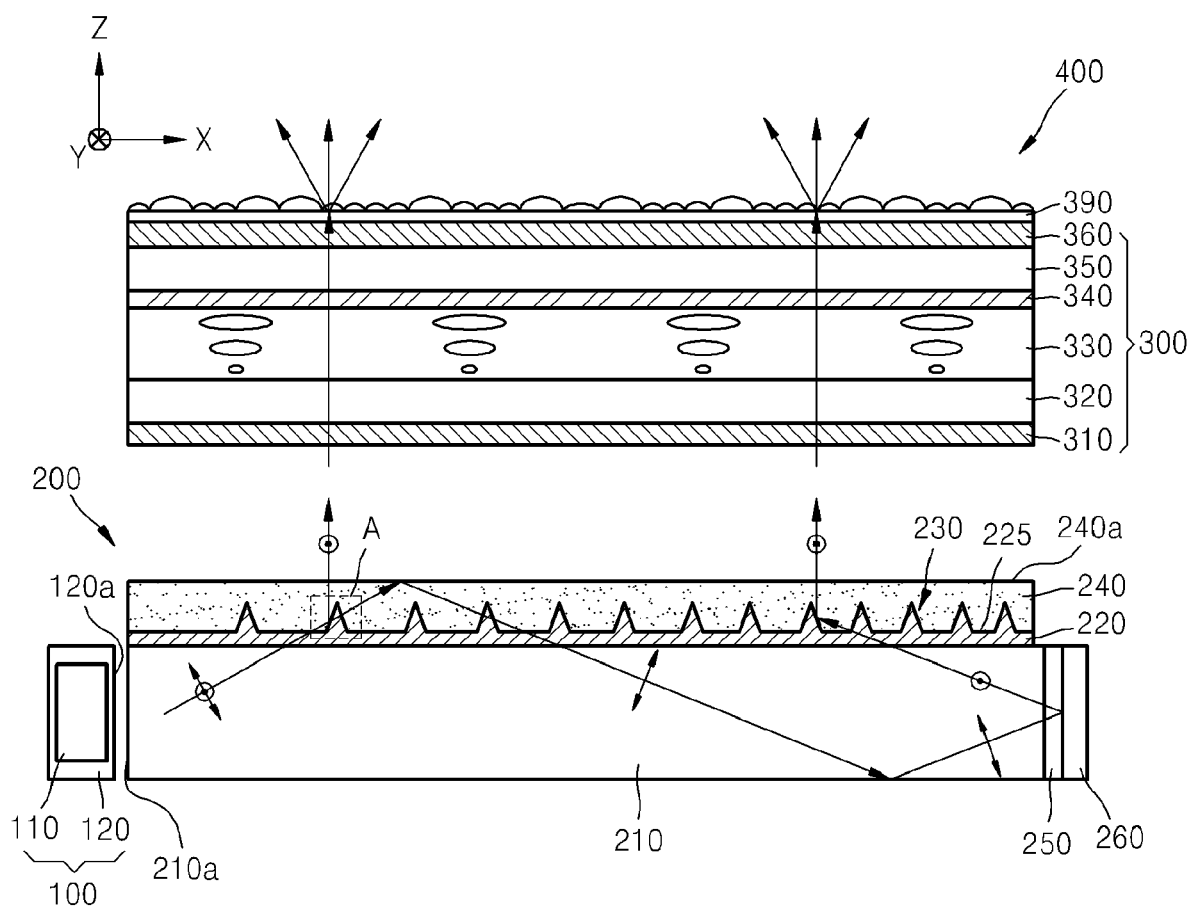
FIG. 2 is a cross-sectional view of a liquid crystal display according to an exemplary embodiment of the present invention.
Figure 3:
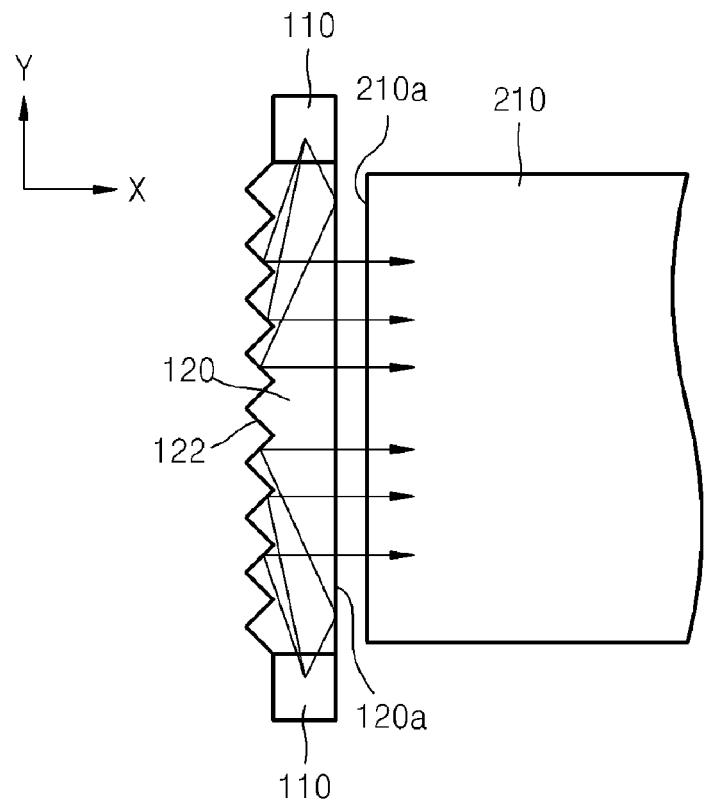
FIG. 3 is a plane view of a light source unit employed in the liquid crystal display of FIG. 2.

FIG. 2 is a cross-sectional view of a liquid crystal display 400 according to an exemplary embodiment of the present invention. FIG. 3 is a plane view of a light source unit 100. Referring to FIGS. 2 and 3, the liquid crystal display 400 includes a light source unit 100 which irradiates light, a polarized light guide plate 200 which polarizes, collimates, and out-couples light from the light source unit 100, a liquid crystal panel 300 which modulates the light out-coupled from the polarized light guide plate 200 to form images, and a diffusion layer 390 which diffuses the light modulated by the liquid crystal panel 300.

The light source unit 100 irradiates light onto an incident surface 210a of the polarized light guide plate 200, and may include a point light source 110, such as a light emitting diode (LED), and a light guide bar 120 which guides light from the point light source 110 onto the incident surface 210a. The light guide bar 120 may be formed of a transparent material having a refractive index greater than 1, and may be formed of a material such as polymethylmethacrylate (PMMA) or polycarbonate (PC). A prism pattern 122 is formed in a side of the light guide bar 120. Light from the point light source 110 is totally internally reflected on another side 120a where the prism pattern 122 is not formed, and is reflected by the prism pattern 122 toward the incident surface 210a. In other words, light irradiated from the point light source 110 to the light guide bar 120 is incident on the incident surface 210a in a uniform distribution range, as if it were irradiated from a line light source. The above described structure of the light source unit 100 is an example, and the light source unit 100 may alternatively be formed of a plurality of point light sources facing the incident surface 210a.

The polarized light guide plate 200 polarizes and out-couples light from the liquid source unit 100. To this end, the polarized light guide plate 200 includes a first layer 210 having an incident surface 210a which receives and guides light from the light source unit 100, a second layer 220 formed on the first layer 210 which has a plurality of repeated out-coupling units 230, and a third layer 240 formed on the second layer 220 of an optically anisotropic material. The first layer 210 is formed of a transparent member that transmits light. For example, the first layer 210 may be formed of an optically isotropic material, such as PMMA or PC. The second layer 220 is formed of an optically isotropic material on the first layer 210, and includes the out-coupling units 230. The third layer 240 is formed of an optically anisotropic material. The out-coupling units 230 are formed to polarize light at the boundary between the second layer 220 and the third layer 240. The shape and polarization effect of the out-coupling 230 will be described later in detail. The second layer 220 may be formed of a material having almost the same refractive index as the first layer 210. A plane portion 225 is formed between the out-coupling units 230. The distance between the out-coupling units 230, that is, the width of the plane portion 225, is controlled based on the distribution of the out-coupled light. The distance may be uniform or, as illustrated in FIG. 2, reduced away from the light source unit 100. The third layer 240 is formed of an optically anisotropic material on the second layer 220. The third layer 240 may be formed of a material having a refractive index that is greater than a refractive index of the second layer 220 with respect to a first polarized light, and that is almost the same as a refractive index of the second layer 220 with respect to a second polarized light, where the first polarized light is perpendicular to the second polarized light. The first polarized light may be S-polarized light, and the second polarized light may be P-polarized light.

A polarization conversion member 250 and a reflection member 260 may be formed at a side of the first layer 210 to convert the polarization of the incident light and to reflect light back into the first layer 210. The polarization conversion member 250 may be a quarter wavelength plate.

The liquid crystal panel 300 modulates light illuminated from the polarized light guide plate 200 to form images. The liquid crystal panel 300 includes a first substrate 320, a second substrate 350, and a liquid crystal layer 330 encapsulated between the first and second substrates 320 and 350. The arrangement of the liquid crystals changes based on the voltage applied to the liquid crystal layer 330, and the incident light is switched on and off based on the arrangement of the liquid crystals. The liquid crystals may be arranged in a TN mode. In the TN mode, the main axis of the liquid crystals is parallel to the first and second substrates 320 and 350. The azimuthal direction of the main axis changes continuously, and thus the liquid crystals are arranged in a twisted state at 90° between the first and second substrates 320 and 350. The TN mode is easy and inexpensive to manufacture. The liquid crystals may also be arranged in a VA mode. First and second polarization plates 310 and 360 are attached on external sides of the first and second substrates 320 and 350, respectively. For example, the first polarization plate 310 transmits the first polarized light and absorbs the other polarized light, and the second polarization plate 360 transmits the second polarized light and absorbs the other polarized light. In other words, the optical axes of the first and second polarization plates 310 and 360 are perpendicular to each other. For example, the optical axis of the first polarization plate 310 may be a vertical direction of the liquid crystal panel 300, which corresponds to a Y direction in FIGS. 2 and 3. The optical axis of the second polarization plate 360 may be a horizontal direction of the liquid crystal panel 300, which corresponds to an X direction in FIGS. 2 and 3. A color filter 340 is formed in the second substrate 350. Also, pixel electrodes for driving each pixel and thin film transistors (TFT) are formed in the liquid crystal panel 300, but are not shown in the figures.

A diffusion layer 390 is formed on the liquid crystal panel 300 to diffuse light modulated by the liquid crystal panel 300. The diffusion layer 390 may be formed as a single body with the second polarization plate 360. A layer including an internal or surface diffusing element like beads may be additionally manufactured and attached to an upper surface of the second polarization plate 360 using an adhesive layer, or a layer including a diffusing element like beads may be directly coated on the upper surface of the second polarization plate 360. Also, an anti-reflection layer (not shown) may be further formed on the diffusion layer 390 by vacuum deposition.

The formation of images having a high brightness and a wide viewing angle by the liquid crystal display 400 will now be described. The operation of the polarized light guide plate 200 to polarize and out-couple light irradiated from the light source unit 100 will be described with reference to FIGS. 4A through 4D, which illustrate various exemplary embodiments of the out-coupling units 230.

Figure 4A:
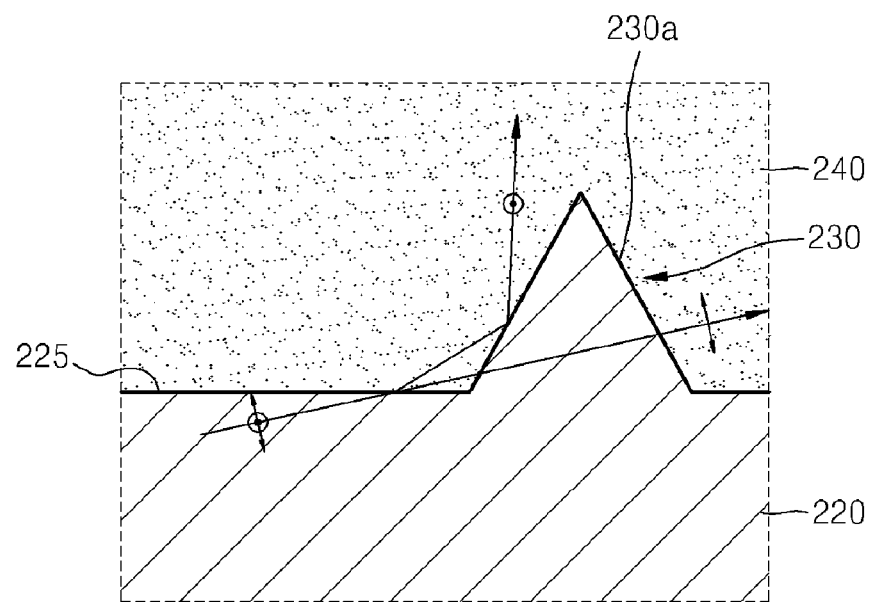
FIGS. 4A through 4D are enlargements of a portion A of FIG. 2, showing various embodiments of an out-coupling unit.

Referring to FIG. 4A, an out-coupling unit 230 includes a first convex portion 230a. The first convex portion 230a may have the form of a prism. Among unpolarized light emitted from the light source unit 100, the first polarized light is totally internally reflected in the first convex portion 230a. The first polarized light is incident at an angle of almost 90° to a boundary surface 240a between the third layer 240 and the outside. Accordingly, the first polarized light is collimated in a direction approximately perpendicular to the boundary surface 240a and out-coupled. Since the refractive index of the third layer 240 with respect to the second polarized light is almost the same as the refractive index of the second layer 220, the second polarized light proceeds without recognizing the out-coupling unit 230. As illustrated in FIG. 2, the second polarized light is reflected on the boundary surface 240a between the third layer 240 and the outside, and is oriented toward the first layer 210. After the polarization of the second polarized light is converted to the polarization of the first polarized light by the polarization conversion member 250, the light is reflected by the out-coupling unit 230 and then out-coupled.

Figure 4B:
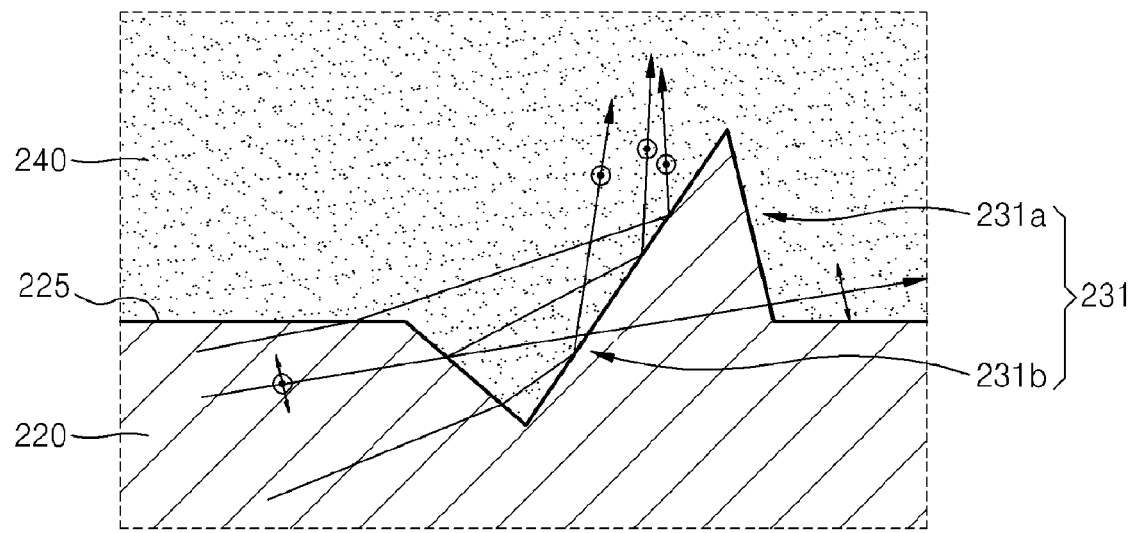

Referring to FIG. 4B, an out-coupling unit 231 includes a first convex portion 231a and a first concave portion 231b. The convex portion 231a may have the form of a prism, and the first concave portion 231a and the first convex portion 231b may be formed continuously. Among unpolarized light irradiated from the light source unit 100, the first polarized light sequentially passes through the first concave portion 231b and the first convex portion 231a or the plane portion 225 and then the first convex portion 231a, and is then totally internally reflected in the first convex portion 231a. The first polarized light that is totally internally reflected in the first convex portion 231a is incident on the boundary surface 240a at an approximately vertical angle, and thus passes the boundary surface 240a approximately vertically. The first concave portion 231b increases the incidence angle of light incident on the first convex portion 231a, and thus the amount of light that is totally internally reflected in the first convex portion 231a is increased. Since the second polarized light does not recognize the out-coupling unit 231, the second polarized light proceeds straight toward the boundary surface 240a, and is totally internally reflected from the boundary surface 240a to the first layer 210.

Figure 4C:
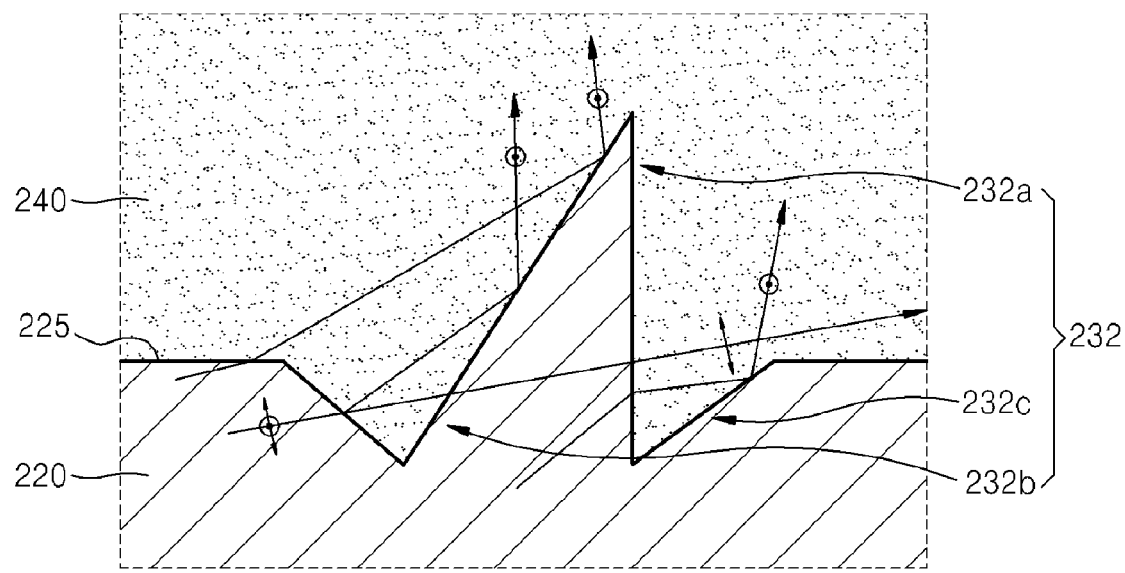

Referring to FIG. 4C, an out-coupling unit 232 is formed of a first concave portion 232b, a first convex portion 232a, and a second concave portion 232c that are continuously formed. Among unpolarized light irradiated from the light source unit 100, first polarized light passes through the plane portion 225 or the first concave portion 232b, is directed toward the first convex portion 232a, and is then totally internally reflected in the first convex portion 232a. As the first polarized light passes through the first concave portion 232a, its incidence angle increases at the first convex portion 232a, thereby increasing the amount of light that is totally internally reflected. The first polarized light may also be totally internally reflected in the second concave portion 232c, thereby contributing to an increased amount of reflected light. The first polarized light that is totally internally reflected in the first convex portion 232a or the second concave portion 232c is out-coupled almost perpendicular to the boundary surface 240a. As described above, the second polarized light does not recognize the out-coupling unit 232, and is totally internally reflected by the boundary surface 240a.

Figure 4D:
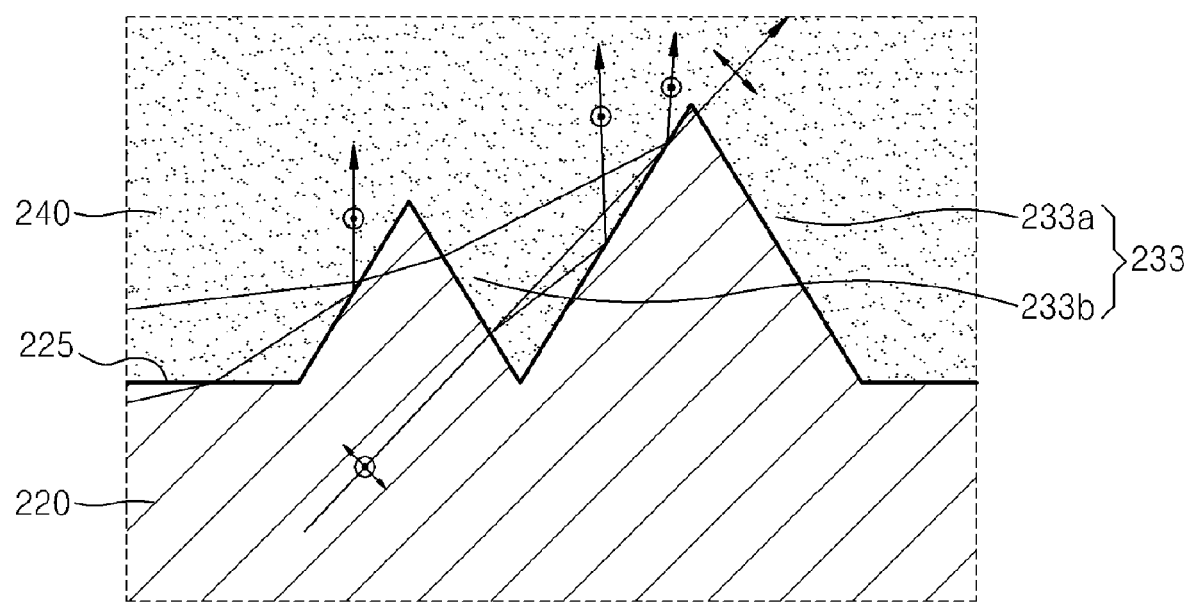

Referring to FIG. 4D, an out-coupling unit 233 includes a first convex portion 233a and a second convex portion 233b. The convex shape of the first convex portion 233a and the second convex portion 233b may have the form of a prism. Among unpolarized light irradiated from the light source unit 100, most of the first polarized light is totally internally reflected by the first convex portion 233a or the second convex portion 233b. When the first polarized light incident on the first convex portion 233a does not satisfy the conditions for total internal reflection, a portion of that light is refracted and transmitted through the first convex portion 233a to be incident on the second convex portion 233b. This light is incident on the second convex portion 233b at an angle greater than an angle when the light is incident on the first convex portion 233a, and thus the light is more likely to satisfy the conditions for total internal reflection. The first polarized light that is totally internally reflected in the first convex portion 233a and the second convex portion 233b is out-coupled almost perpendicular to the boundary surface 240a. The apex angle or the height of the prism shape employed in the first convex portion 233a and the second convex portion 233b may be selected to provide more totally internally reflected light.

Figure 5A:
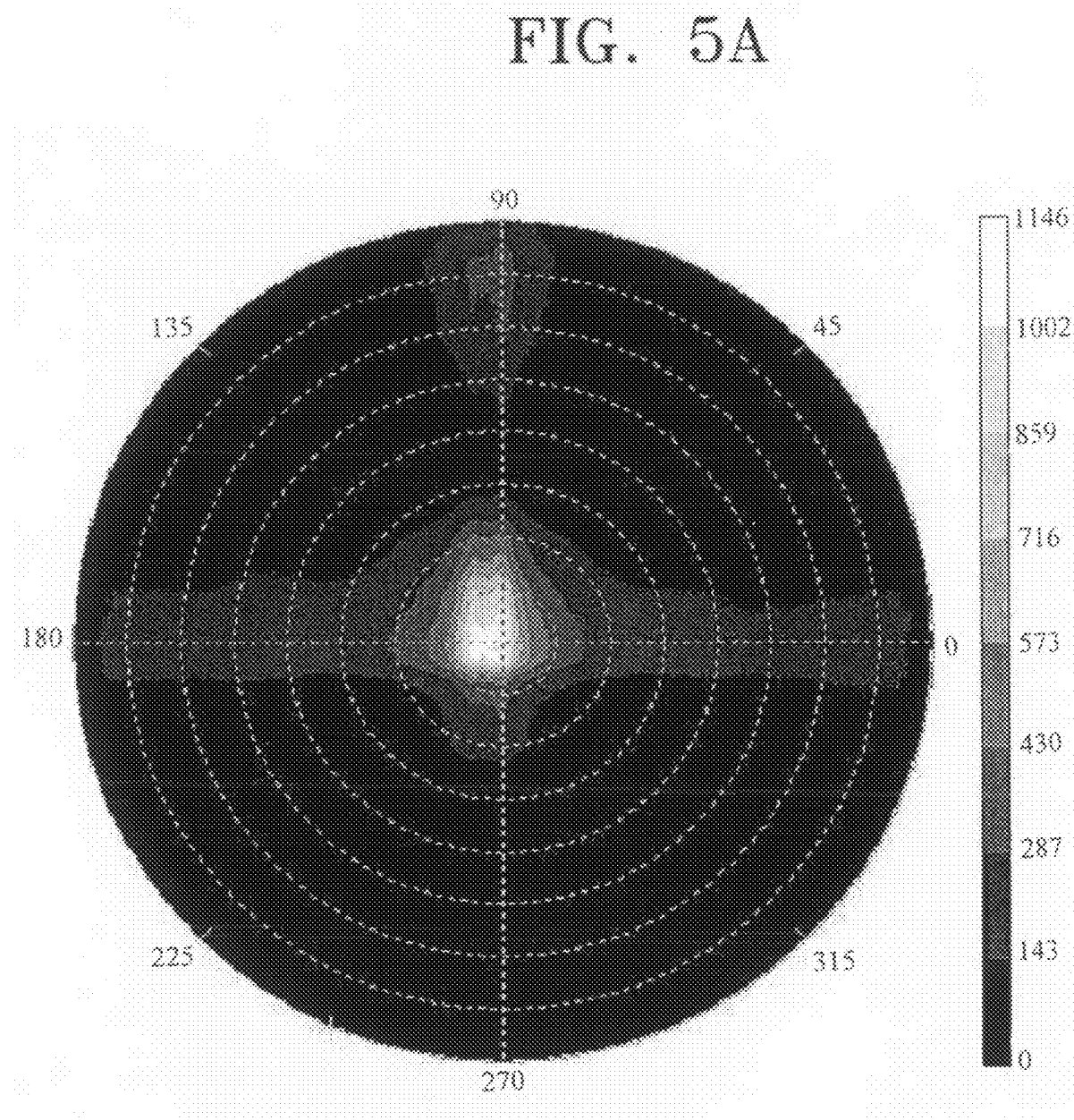
FIGS. 5A and 5B illustrate the light distribution of first polarized light and second polarized light, respectively, illuminated from a polarized light out-coupling light guide plate employed in the liquid crystal display of FIG. 2.
Figure 5B:
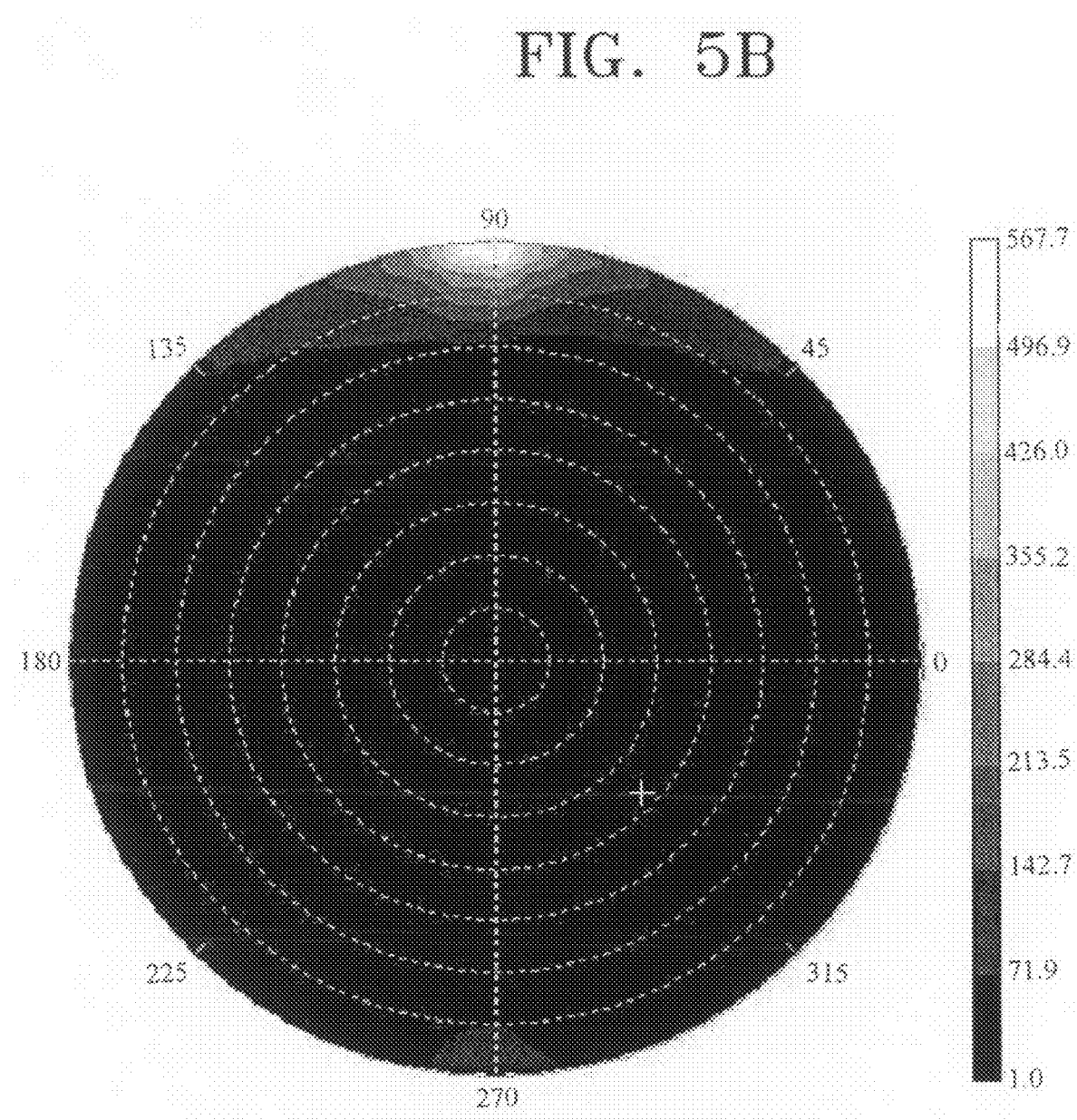
Figure 6:
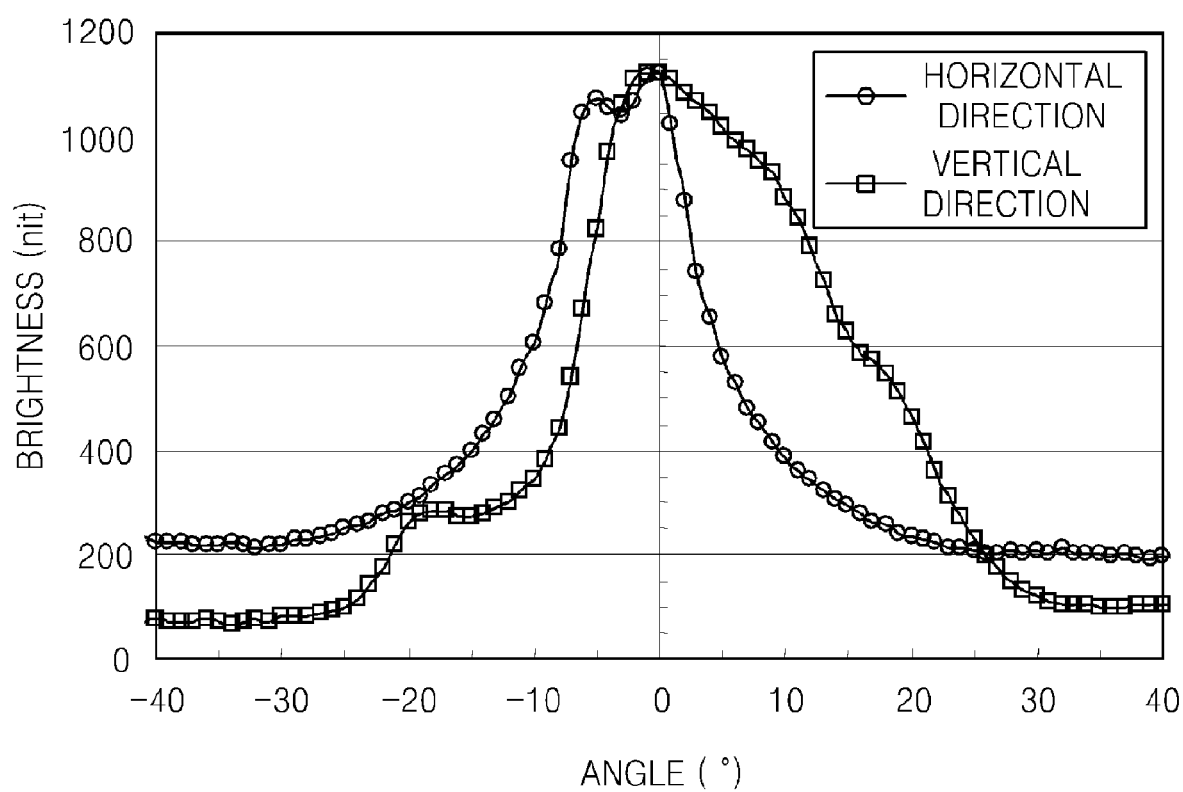
FIG. 6 illustrates the collimation characteristics of first polarized light in a horizontal direction and in a vertical direction.

FIGS. 5A and 5B illustrate the light distribution of the first polarized light and the second polarized light out-coupled from the polarized light guide plate 200, respectively. FIG. 6 illustrates the collimation characteristics of the first polarized light in a horizontal direction and in a vertical direction. The luminance of the first polarized light along the normal direction is about 1121 nit ($cd/m^2$), and the luminance of the second polarized light along the normal direction is about 8 nit ($cd/m^2$). The contrast ratio, defined as the luminance ratio of the first polarized light to the second polarized light along the normal direction, is about 145, indicating good polarization separating characteristics. The full width at half maximum (FWHM) of the first polarized light in a horizontal direction is about 16°, and the FWHM of the first polarized light in a vertical direction is about 25°. This data indicates that the polarized light guide plate 200 has good polarization separating performance and collimating characteristics.

The light out-coupled from the polarized light guide plate 200 is incident on the first polarization plate 310 of the liquid crystal panel 300. The first polarization plate 310 transmits the first polarized light and absorbs the second polarized light. Since light out-coupled from the polarized light guide plate 200 and directed toward the liquid crystal panel 300 is mostly first polarized, the light passes through the first polarization plate 310 almost without loss. Accordingly, high brightness can be achieved with low power consumption. Next, the first polarized light passing through the liquid crystal layer 330 maintains the same polarization or is converted to a perpendicular polarization based on the voltage applied to the liquid crystal layer 330 in pixel units, and is modulated by being blocked or transmitted by the second polarization plate 360. Also, the diffusion layer 390 diffuses the light that is modulated and transmitted through the liquid crystal panel 300 to increase the viewing angle. An anti-reflection layer (not shown) may be further formed on the diffusion layer 390.

This prevents reduced image quality due to external light when the liquid crystal display 400 is employed in a mobile display device and used outdoors.

As described above, the liquid crystal display according to exemplary embodiments of the present invention includes a polarized light guide plate having good collimating and polarization separating characteristics as an illumination system, and a diffusion layer diffusing the light modulated in a liquid crystal panel.

Light that is polarized by the polarized light guide plate is incident on the liquid crystal panel, which minimizes light loss due to the polarization plates, and thereby increases light efficiency. Accordingly, a high brightness can be obtained at a low power consumption, while achieving a wide viewing angle.

In general, in the liquid crystal display using a TN mode, the optical axes of the upper and lower polarization plates of the liquid crystal panel have angles of 45° and 135° with respect to a horizontal axis of the liquid crystal display, to obtain symmetric contour of the contrast ratio of light incident on the liquid crystal panel at inclined angles. However, these angles do not correspond to the rolling direction of a base material for manufacturing polarization plates, and thus the manufacturing cost increases. However, the polarization plates employed in exemplary embodiments of the present invention provide collimated light to the liquid crystal panel. Therefore, the optical axes of the polarization plates can be 0° and 90°, which are consistent with the rolling direction of the base material, thereby reducing the manufacturing cost.

While the present invention has been particularly shown and described with reference to exemplary embodiments thereof, it will be understood by those of ordinary skill in the art that various changes in form and detail may be made therein without departing from the spirit and scope of the present invention as defined by the following claims and their legal equivalents.

What is claimed is:

1. A liquid crystal display comprising:
   a light source unit;
   a polarized light guide plate comprising an incident surface onto which unpolarized light from the light source unit is incident, wherein the polarized light guide plate polarizes, collimates, and out-couples the incident light;
   a liquid crystal panel which modulates the light illuminated from the polarized light guide plate to form images; and
   a diffusion layer which diffuses the light modulated in the liquid crystal panel, wherein:
   the polarized light guide plate further comprises:
      a first layer which guides the incident light;
      a second layer formed of an optically isotropic material on the first layer, wherein out-coupling units comprising a first convex portion are repeatedly arranged on the second layer; and
      a third layer formed of an optically anisotropic material on the second layer,
   a refractive index of the optically anisotropic material is greater than a refractive index of the second layer with respect to a first polarized light, and almost the same as the refractive index of the second layer with respect to a second polarized light,
   the first polarized light is perpendicular to the second polarized light, and
   the polarized light guide plate out-couples the first polarized light;
   wherein the liquid crystal panel comprises a first substrate upon which a first polarization plate is attached, a second substrate upon which a second polarization plate is attached, and a liquid crystal layer encapsulated between the two substrates; and
   wherein the diffusion layer and one of the first polarization plate and the second polarization plate are formed as a single body at an outer side of the liquid crystal panel.

2. The liquid crystal display of claim 1, wherein the light source unit comprises:
   a point light source; and
   a light guide bar which guides light from the point light source to the incident surface,
   wherein the light guide bar comprises a prism pattern formed on a side of the light guide bar.

3. The liquid crystal display of claim 1, wherein the light source unit comprises a plurality of point light sources which face the incident surface.

4. The liquid crystal display of claim 1, wherein a polarization conversion member and a reflection member are formed at a side of the polarized light guide plate.

5. The liquid crystal display of claim 4, wherein the polarization conversion member is a quarter wavelength plate.

6. The liquid crystal display of claim 1, further comprising an anti-reflection layer on the diffusion layer.

7. The liquid crystal display of claim 1, wherein liquid crystals of the liquid crystal layer are arranged in a twisted nematic (TN) mode.

8. The liquid crystal display of claim 1, wherein liquid crystals of the liquid crystal layer are arranged in a vertical alignment (VA) mode.

9. The liquid crystal display of claim 1, wherein an optical axis of the first polarization plate is oriented at an angle of 0° with respect to a horizontal direction of the liquid crystal panel, and an optical axis of the second polarization plate is oriented at an angle of 90° with respect to the horizontal direction of the liquid crystal panel.

10. The liquid crystal display of claim 1, wherein the first convex portion has a shape of a prism.

11. The liquid crystal display of claim 1, wherein a plane portion is formed between neighboring out-coupling units.

12. The liquid crystal display of claim 11, wherein a width of the plane portion is gradually reduced away from the light source unit.

13. The liquid crystal display of claim 1, wherein the out-coupling units further comprise a first concave portion connected to a first side of the first convex portion.

14. The liquid crystal display of claim 13, wherein the out-coupling units further comprise a second concave portion connected to a second side of the first convex portion.

15. The liquid crystal display of claim 1, wherein the out-coupling units comprise a second convex portion connected to a side of the first convex portion.

16. The liquid crystal display of claim 15, wherein the second convex portion has a shape of a prism.

* * * * *